(12) United States Patent
Mao et al.

(10) Patent No.: US 9,171,664 B2
(45) Date of Patent: Oct. 27, 2015

(54) TOUCH INPUT DEVICE AND INDUCTION COIL THEREOF

(71) Applicant: WALTOP INTERNATIONAL CORP., Hsinchu (TW)

(72) Inventors: Chung Fuu Mao, Hsinchu (TW); Chia Jui Yeh, Hsinchu (TW); Chien Chia Lien, Hsinchu (TW)

(73) Assignee: WALTOP INTERNATIONAL CORP., Hsinchu (TW)

( * ) Notice: Subject to any disclaimer, the term of this patent is extended or adjusted under 35 U.S.C. 154(b) by 105 days.

(21) Appl. No.: 14/152,592

(22) Filed: Jan. 10, 2014

(65) Prior Publication Data

US 2015/0109541 A1 Apr. 23, 2015

(30) Foreign Application Priority Data

Oct. 18, 2013 (TW) .............................. 102137796 A

(51) Int. Cl.
*G06F 3/044* (2006.01)
*H01F 27/28* (2006.01)

(52) U.S. Cl.
CPC ............ *H01F 27/2828* (2013.01); *G06F 3/044* (2013.01); *G06F 2203/04105* (2013.01); *G06F 2203/04106* (2013.01)

(58) Field of Classification Search
CPC ...................................................... G06F 3/03547
See application file for complete search history.

(56) References Cited

U.S. PATENT DOCUMENTS

2012/0287053 A1* 11/2012 Bos et al. ....................... 345/173

* cited by examiner

*Primary Examiner* — Gerald Johnson
(74) *Attorney, Agent, or Firm* — Hauptman Ham, LLP

(57) ABSTRACT

An induction coil of a touch input device provided in the present invention includes a ribbon cable and a coupling device. The ribbon cable is disposed on a plane, and the ribbon cable has a first terminal and a second terminal and has a plurality of wires. The ribbon cable defines a sensing region on the plane by a plurality of bends. The coupling device is utilized to couple the wires at the first terminal and the second terminal such that the wires form a circuit with a plurality of turns wound by a single conducting wire. A touch input device is further provided in the present invention.

19 Claims, 4 Drawing Sheets

TOUCH INPUT DEVICE AND INDUCTION COIL THEREOF

TECHNICAL FIELD OF THE INVENTION

The present invention relates to an induction coil, and especially to a touch input device and an induction coil thereof for use with an electromagnetic stylus.

BACKGROUND OF THE INVENTION

A capacitive touch panel is a substrate on which transparent electrode patterns are coated. When a finger is closes to or contacts the touch panel, a coupling capacitor is formed between the finger and the transparent electrode patterns because the finger is a conductor and has static electricity. Meanwhile, electrical capacitance of the electrode positioned at a touch point on the touch panel will change, thus making voltage or current on the electrode change. And then by comparing the voltage difference between the electrode and adjacent electrodes, a position of the touch point can be calculated.

However, although the touch input by the fingers is convenient, it is obviously difficult to achieve the following requirements of depicting lines with various thicknesses on a touch-screen, or realizing touch recognition for fine locations by the fingers. Therefore, in order to increase the accuracy of the touch and have a function of pressure sensing, a solution by using an electromagnetic stylus/pen has been proposed. However, the conventional touch panel, which is used with the electromagnetic pen, needs to be equipped with an induction coil for interacting with the electromagnetic pen so as to generate a pressure sensitive signal.

At present, there are three solutions to dispose the induction coil on the touch panel. The first is to wind wires around the touch panel manually. However, not only is the manual winding labor-intensive, but it is inconsistent with a requirement of automated production. The second is to arrange the induction coil on a circuit board and then to assemble the circuit board and the original touch panel. However, this solution has a drawback of increasing a thickness of the entire touch module. The third is to coat a pattern of the induction coil with transparent metal on a substrate of the capacitive touch panel. However, this solution needs to change the design of a photomask, so it will greatly increase the cost.

SUMMARY OF THE INVENTION

Accordingly, an objective of the present invention is to provide an induction coil of a touch input device for solving the above-mentioned drawbacks by means of bending a ribbon cable and employing a specific coupling manner, and it has the advantages of low costs and simple manufacturing processes.

Another objective of the present invention is to provide a touch input device, which has the induction coil capable of solving the above-mentioned drawbacks by means of bending the ribbon cable and employing the specific coupling manner, and it also has the advantages of the low costs and the simple manufacturing processes.

To achieve the foregoing objectives, according to an aspect of the present invention, the induction coil of the touch input device provided in the present invention includes a ribbon cable and a coupling device. The ribbon cable is disposed on a plane, and the ribbon cable has a first terminal and a second terminal and has a plurality of wires. The ribbon cable defines a sensing region on the plane by a plurality of bends. The coupling device is utilized to couple the wires at the first terminal and the second terminal such that the wires form a circuit with a plurality of turns wound by a single conducting wire.

In one preferred embodiment, the wires are arranged in a single layer in the ribbon cable. In other preferred embodiments, the wires are arranged in double or multi layers in the ribbon cable.

In one preferred embodiment, the ribbon cable has a plurality of bending angles between 45 and 135 degrees, such as 90 degrees.

In one preferred embodiment, each of the bends of the ribbon cable has an overlapping portion. In addition, the ribbon cable is a flat flexible cable or flexible printed circuit board.

In one preferred embodiment, the coupling device is a pair of male and female connectors. In other preferred embodiments, the coupling device is a circuit board having a plurality of contacts, which are electrically coupled to the wires.

Similarly, to achieve the foregoing objectives, the touch input device provided in the present invention is utilized to sense a position and a pressure of an electromagnetic pen on a touch screen. The touch input device includes a touch panel and an induction coil, in which the touch panel is utilized to generate a position signal. The induction coil, which is disposed around the touch panel, is utilized to interact with the electromagnetic pen for generating a pressure sensitive signal. The induction coil includes a ribbon cable and a coupling device. The ribbon cable is disposed on a plane, and the ribbon cable has a first terminal and a second terminal and has a plurality of wires. The ribbon cable defines a sensing region on the plane by a plurality of bends. The coupling device is utilized to couple the wires at the first terminal and the second terminal such that the wires form a circuit with a plurality of turns wound by a single conducting wire.

In one preferred embodiment, the plane is a surface of a liquid crystal display (LCD) panel.

In one preferred embodiment, the wires are arranged in a single layer in the ribbon cable. In other preferred embodiments, the wires are arranged in double or multi layers in the ribbon cable.

In one preferred embodiment, the ribbon cable has a plurality of bending angles between 45 and 135 degrees, such as 90 degrees.

In one preferred embodiment, each of the bends of the ribbon cable has an overlapping portion. In addition, the ribbon cable is a flat flexible cable or flexible printed circuit board.

In one preferred embodiment, the coupling device is a pair of male and female connectors. In other preferred embodiments, the coupling device is a circuit board having a plurality of contacts, which are electrically coupled to the wires.

In comparison with the prior art, the present invention employs the ribbon cable which has the plurality of bends, thereby surrounding the touch panel. Therefore, the above-mentioned drawbacks in the prior art can be simply overcome. In addition, the coupling device has a connection manner as jumper wires which are capable of making the wires arranged in parallel be coupled as the circuit with the plurality of turns wound by the single conducting wire so as to form the induction coil of the present invention.

It is to be understood that both the foregoing general description and the following detailed description of the present invention are exemplary and explanatory and are intended to provide further explanation of the invention as claimed.

DETAILED DESCRIPTION OF THE INVENTION

Figure 1:
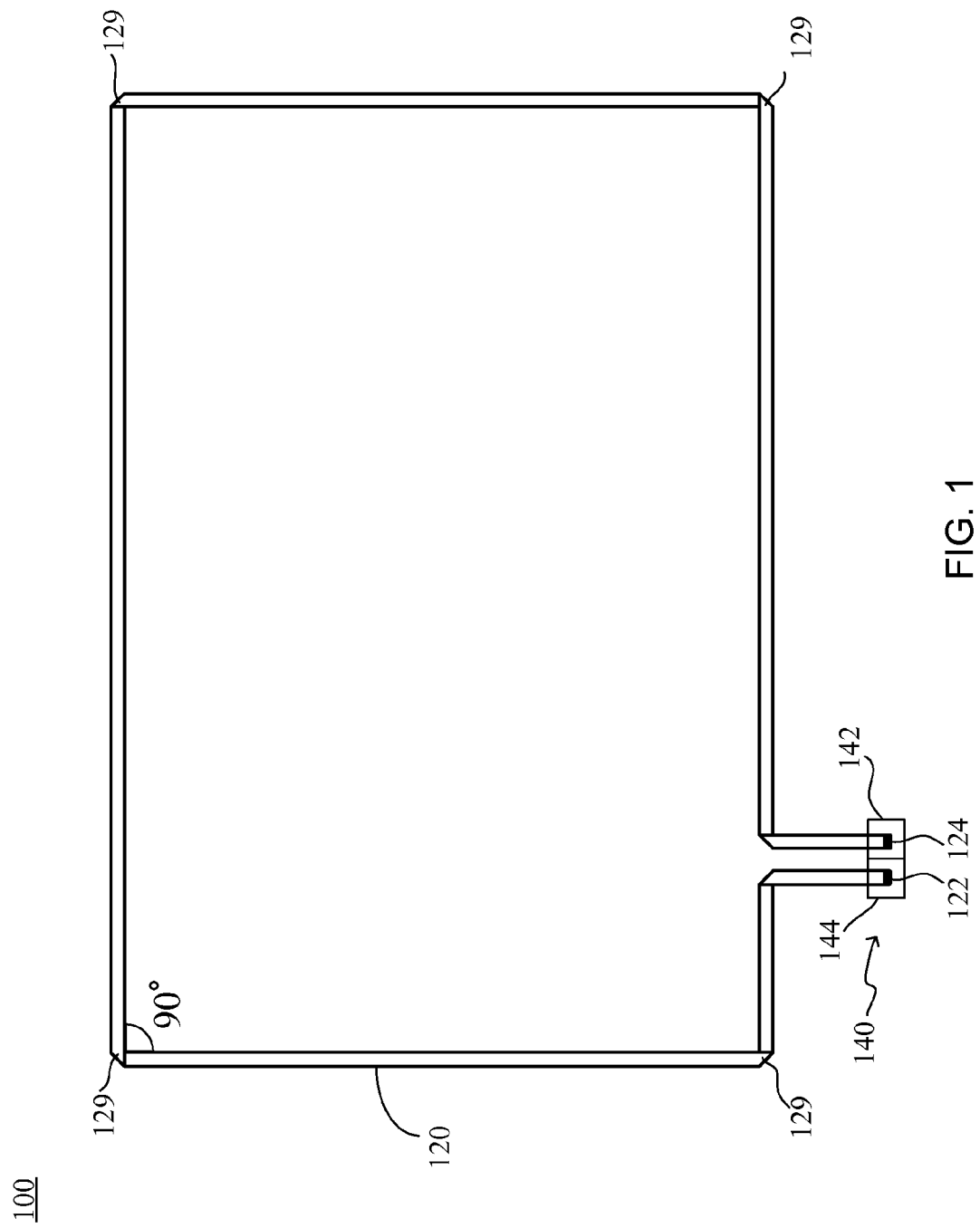
FIG. 1 is a top view illustrating an induction coil of a touch input device according to a preferred embodiment of the present invention.

The present invention will now be described in detail with reference to a few preferred embodiments thereof as illustrated in the accompanying drawings. The same reference numerals refer to the same parts or like parts throughout the various figures.

Figure 2:
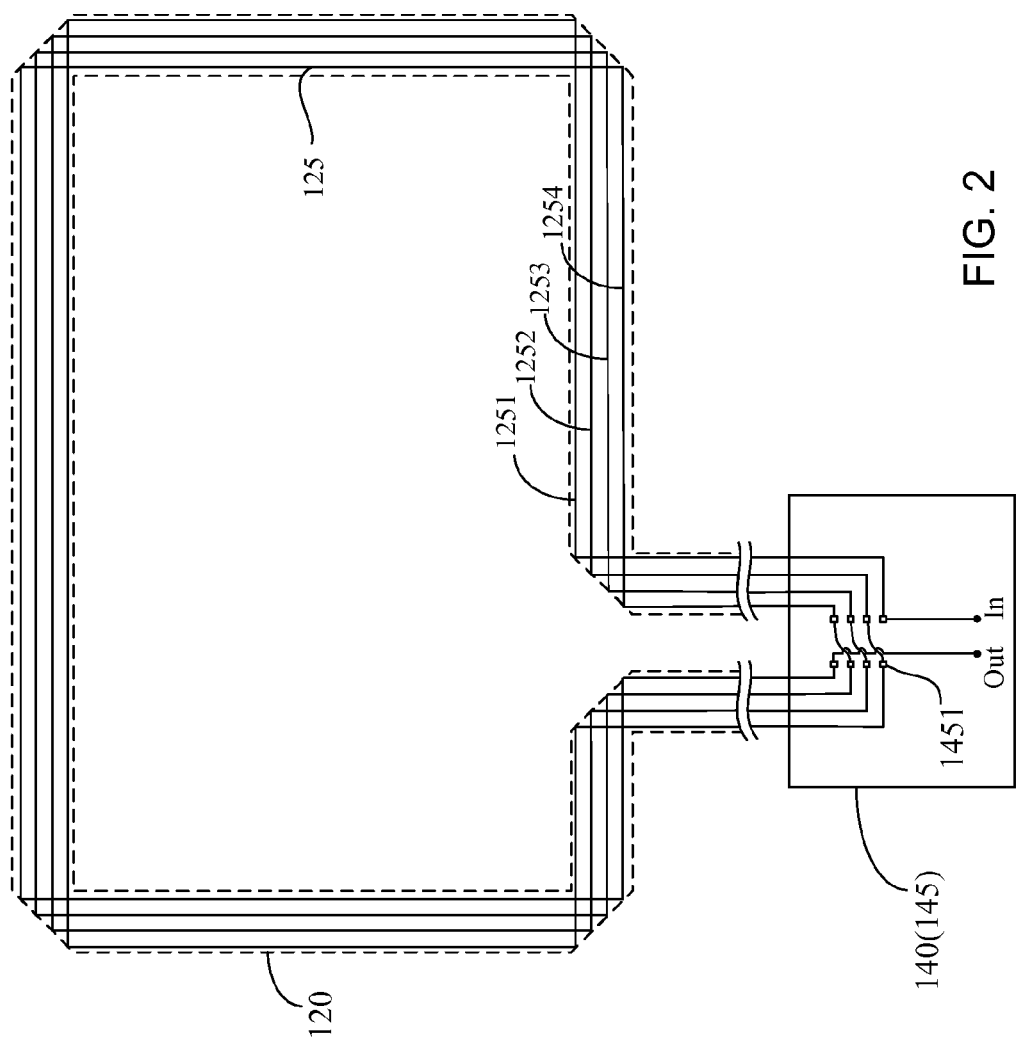
FIG. 2 is a top view schematically illustrating an induction coil of a touch input device according to a preferred embodiment of the present invention.

Referring to FIG. 1 and FIG. 2, FIG. 1 is a top view illustrating an induction coil of a touch input device according to a preferred embodiment of the present invention; FIG. 2 is a top view schematically illustrating an induction coil of a touch input device according to a preferred embodiment of the present invention. It should be noted that elements in the above-mentioned drawings are not depicted as actual proportion for clarity. The induction coil 100 includes a ribbon cable 120 and a coupling device 140. In the embodiment, the ribbon cable 120 is a flexible flat cable (FFC), which is a kind of ribbon cable made up of sandwiching a plurality of copper wires between films at high temperature. However, in other embodiments, the ribbon cable 120 can be a flexible printed circuit (FPC) board or other suitable flexible ribbon cables.

As shown in FIG. 1, the ribbon cable 120 is disposed on a plane, and the ribbon cable 120 has a first terminal 122 and a second terminal 124, i.e. head and tail ends of ribbon cable 120. Referring to FIG. 2, the ribbon cable 120 has a plurality of wires 125. In the embodiment, the wires are explained by four wires 1251, 1252, 1253, and 1254. However, the present invention is not limited to the number of the wires 125.

Figure 3A:
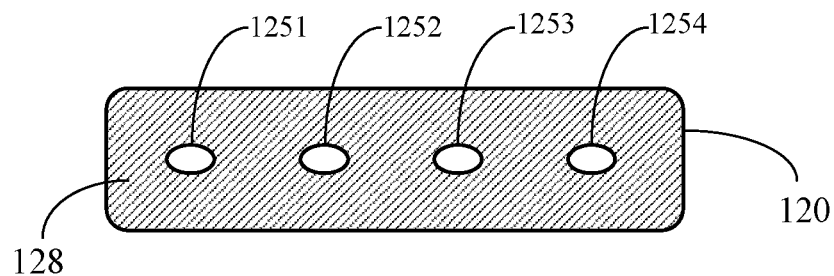
FIGS. 3A to 3C depict cross-sectional views schematically illustrating the ribbon cable according to the preferred embodiments of the present invention.
Figure 3B:
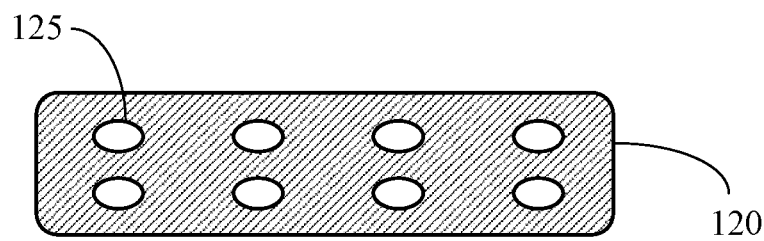
Figure 3C:
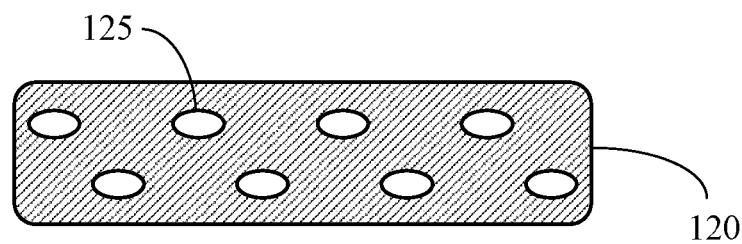

Referring to FIGS. 3A to 3C, FIGS. 3A to 3C depict cross-sectional views schematically illustrating the ribbon cable according to the preferred embodiments of the present invention. In the embodiment, the cross-sectional view of the ribbon cable 120 is shown in FIG. 3A. The ribbon cable 120 has the four wires 1251, 1252, 1253, and 1254 which are insulated from each other and disposed within an insulation film 128. Moreover, as shown in FIG. 3A, the wires 1251, 1252, 1253, and 1254 are arranged in a single layer in the ribbon cable 120. In other embodiments, in order to save the width occupied by the ribbon cable 120, the wires 125 also can be arranged in double layers, as shown in FIGS. 3B and 3C, even in multi-layers. The wires 125 that are arranged in the double layers herein can be aligned up and down as shown in FIG. 3B or can be interleaved as shown in FIG. 3C.

Referring to FIG. 1 again, the ribbon cable 120 defines a sensing region on the plane by a plurality of bends, and the sensing region is a sensing area of a touch panel (not shown), specifically. In the embodiment, the ribbon cable has a plurality of bending angles which are between 45 and 135 degrees, e.g. 90 degrees as shown in FIG. 1 and FIG. 2. In addition, each of the bends of the ribbon cable 120 has an overlapping portion 129, thereby keeping the ribbon cable 120 lying on the plane to reduce the thickness thereof. It is worth mentioning that bending manners of the present invention is not limited. For example, each of the bends can be formed by bending toward one direction in sequence, toward two opposite directions in alternate order, or toward the two opposite directions in arbitrary order.

Referring to FIG. 1 and FIG. 2 again, the coupling device 140 is utilized to couple the wires 125 at the first terminal 122 and the second terminal 124 such that the wires 125 forms a circuit with a plurality of turns wound by a single conducting wire. In the example of FIG. 1, the coupling device 140 is a pair of male and female connectors 142 and 144. The male and female connectors 142 and 144 are designed to have a connection manner as jumper wires, so that the wires 125 forms the circuit with the multiple turns wound by the single conducting wire. Among them, the specific design of the male and female connectors 142 and 144 is well-known to a person skilled in the art. Thus, no further detail will be provided herein.

In another embodiment, in order to explain clearly, the ribbon cable 120 is shown as dashed lines as shown in FIG. 2. The coupling device 140 is a circuit board 145 which has a plurality of contacts 1451. The contacts 1451 are electrically coupled to the wires 125. It is worth mentioning that the circuit on the circuit board 145 is just for explanation, and actually wiring may be different. In the example of FIG. 2, the circuit with the multiple turns wound by the single conducting wire forms a circuit with four turns sequentially by one end of the wire 1251 designated as an input terminal In, the wires 1252, the wires 1253, the wires 1254, and the above-mentioned contact 1451. Then one end of the wires 1254 is designated as an output terminal Out.

From the foregoing, the preferred embodiment of the present invention employs the ribbon cable 120 with multiple bends accompanying with the coupling device 140 to form a single-wire coil from the wires 125 arranged in parallel. Therefore, the above-mentioned drawbacks in the prior art can be simply overcome.

What follows is a detail of a touch input device adopting the induction coil 100 of the above-mentioned embodiments. Referring to FIGS. 1 to 4, FIG. 4 is a cross-sectional view schematically illustrating a touch input device according to another preferred embodiment of the present invention. The touch input device of the embodiment is utilized to sense a position and a pressure of an electromagnetic pen (not shown) on a touch screen. The descriptions of the following elements have been explained as above mention, so we need not go into detail herein.

Figure 4:
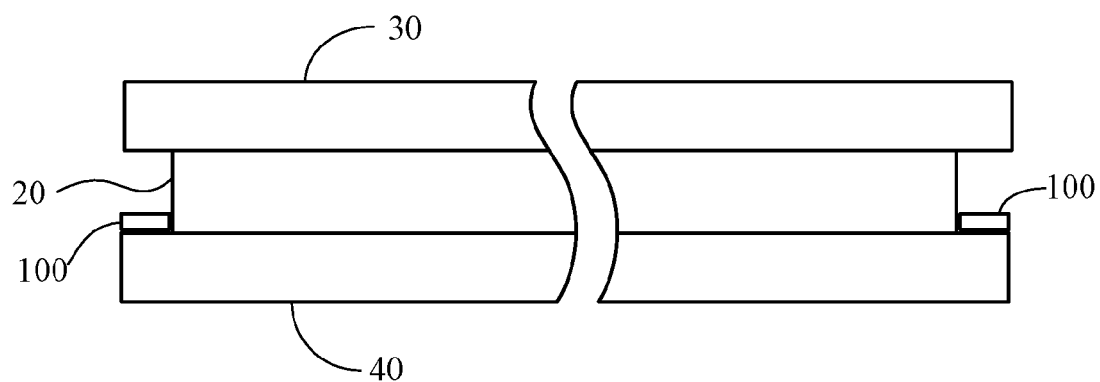
FIG. 4 is a cross-sectional view schematically illustrating a touch input device according to another preferred embodiment of the present invention.

As shown in FIG. 4, the touch input device 10 includes a touch panel 20, an induction coil 100, a cover glass (or cover lens) 30, and a LCD panel 40. Specifically, the touch panel 20 is a capacitive touch panel, and the touch panel 20 is utilized to generate a position signal. That is to say, the electromagnetic pen contacts the cover glass 30, and then the touch panel 20 generates the position signal corresponding to a touch point. The cover glass 30 is disposed on the touch panel 20 for protecting the touch panel 20. In addition, the LCD panel 40 is disposed below the touch panel 20 for displaying frames.

The induction coil 100 of the above-mentioned embodiment, which is disposed around the touch panel 20, is utilized to interact with the electromagnetic pen for generating a pressure sensitive signal. Specifically, as shown in FIG. 1 and FIG. 2, the induction coil 100 includes a ribbon cable 120 and a coupling device 140. The ribbon cable 120 is disposed on a plane. In the embodiment, the plane is the surface of the LCD panel 30, as shown in FIG. 4. The ribbon cable 120 has the first terminal 122 and the second terminal 124 and has the plurality of wires 125. The ribbon cable 120 defines a sensing region on the LCD panel 30 by the plurality of bends. The coupling device 140 is utilized to couple the wires 125 at the first terminal 122 and the second terminal 124 such that the wires 125 forms a circuit with a plurality of turns wound by a single conducting wire.

Similarly, as shown in FIG. 3A, the wires 125 are arranged in a single layer in the ribbon cable 120. In other preferred embodiments, the wires 125 are arranged in a double layer in the ribbon cable 120, as shown in FIGS. 3B and 3C, or in multi-layers. Specifically, the ribbon cable 120 is a flat flexible cable or flexible printed circuit board.

Similarly, as shown in FIG. 1, the ribbon cable 120 has the plurality of bending angles between 45 and 135 degrees, such as 90 degrees. Moreover, each of the bends of the ribbon cable 120 has the overlapping portion 129.

Similarly, as shown in FIG. 1, the coupling device 140 is a pair of male and female connectors 142 and 144. As shown in FIG. 2, the coupling device 140 is the circuit board 145 which has the plurality of contacts 1451. The contacts 1451 are electrically coupled to the wires 125. The circuit with the multiple turns wound by the single conducting wire forms a circuit with four turns sequentially by one end of the wire 1251 designated as an input terminal In, the wires 1252, the wires 1253, the wires 1254, and the above-mentioned contact 1451. Then one end of the wires 1254 is designated as an output terminal Out. The induction coil 100 emits/receives the electromagnetic signals (not shown) via the input terminal In and the output terminal Out for interacting with the electromagnetic pen, thereby obtaining the pressure sensitive signal corresponding to the pressure that the electromagnetic pen exerts on the cover glass 30.

In summary, the present invention employs the ribbon cable 120 surrounding the touch panel by the plurality of bends. Therefore, the above-mentioned drawbacks in the prior art can be simply overcome. In addition, the coupling device 140 has the connection manner as jumper wires which are capable of making the wires 125 arranged in parallel be coupled as the circuit with the plurality of turns wound by the single conducting wire so as to form the induction coil of the present invention.

While the preferred embodiments of the present invention have been illustrated and described in detail, various modifications and alterations can be made by persons skilled in this art. The embodiment of the present invention is therefore described in an illustrative but not restrictive sense.

What is claimed is:

1. An induction coil of a touch input device, comprising:
   a ribbon cable disposed on a plane, the ribbon cable having a first terminal and a second terminal and having a plurality of wires, the ribbon cable defining a sensing region on the plane by a plurality of bends; and
   a coupling device utilized to couple the wires at the first terminal and the second terminal such that the wires form a circuit with a plurality of turns wound by a single conducting wire.

2. The induction coil of claim 1, wherein the wires are arranged in a single layer in the ribbon cable.

3. The induction coil of claim 1, wherein the wires are arranged in double or multi layers in the ribbon cable.

4. The induction coil of claim 1, wherein the ribbon cable has a plurality of bending angles between 45 and 135 degrees.

5. The induction coil of claim 4, wherein the bending angles is about 90 degrees.

6. The induction coil of claim 1, wherein each of the bends of the ribbon cable has an overlapping portion.

7. The induction coil of claim 1, wherein the ribbon cable is a flat flexible cable or flexible printed circuit board.

8. The induction coil of claim 1, wherein the coupling device is a pair of male and female connectors.

9. The induction coil of claim 1, wherein the coupling device is a circuit board having a plurality of contacts, which are electrically coupled to the wires.

10. A touch input device for sensing a position and a pressure of an electromagnetic pen on a touchscreen, comprising:
    a touch panel utilized to generate a position signal; and
    an induction coil disposed around the touch panel to interact with the electromagnetic pen for generating a pressure sensitive signal, the induction coil comprising:
    a ribbon cable disposed on a plane, the ribbon cable having a first terminal and a second terminal and having a plurality of wires, the ribbon cable defining a sensing region on the plane by a plurality of bends; and
    a coupling device utilized to couple the wires at the first terminal and the second terminal such that the wires form a circuit with a plurality of turns wound by a single conducting wire.

11. The touch input device of claim 10, wherein the plane is a surface of a liquid crystal display panel.

12. The touch input device of claim 10, wherein the wires are arranged in a single layer in the ribbon cable.

13. The touch input device of claim 10, wherein the wires are arranged in double or multi layers in the ribbon cable.

14. The touch input device of claim 10, wherein the ribbon cable has a plurality of bending angles between 45 and 135 degrees.

15. The touch input device of claim 14, wherein the bending angles is about 90 degrees.

16. The touch input device of claim 10, wherein each of the bends of the ribbon cable has an overlapping portion.

17. The touch input device of claim 10, wherein the ribbon cable is a flat flexible cable or flexible printed circuit board.

18. The touch input device of claim 10, wherein the coupling device is a pair of male and female connectors.

19. The touch input device of claim 10, wherein the coupling device is a circuit board having a plurality of contacts, which are electrically coupled to the wires.

* * * * *